(12) United States Patent
Lee et al.

(10) Patent No.: US 7,041,934 B2
(45) Date of Patent: May 9, 2006

(54) MICRO-WELDER

(75) Inventors: Yeol-Hwa Lee, Daejeon (KR);
 Seong-Wan Koo, Daejeon (KR);
 Jong-Hak Choi, Daejeon (KR)

(73) Assignee: Agency for Defense Development, Daejeon (KR)

( * ) Notice: Subject to any disclaimer, the term of this patent is extended or adjusted under 35 U.S.C. 154(b) by 148 days.

(21) Appl. No.: 10/452,086

(22) Filed: Jun. 2, 2003

(65) Prior Publication Data
 US 2004/0000537 A1    Jan. 1, 2004

(30) Foreign Application Priority Data
 Jun. 3, 2002    (KR) .................... 10-2002-0031147

(51) Int. Cl.
 *B23K 11/26* (2006.01)
(52) U.S. Cl. .................................. 219/113
(58) Field of Classification Search ............ 219/113, 219/110, 108, 95, 96
 See application file for complete search history.

(56) References Cited

U.S. PATENT DOCUMENTS

| | | | |
|---|---|---|---|
| 2,250,102 A * | 7/1941 | Klemperer | 219/113 |
| 2,508,103 A * | 5/1950 | Dawson | 219/113 |
| 2,515,632 A * | 7/1950 | Coffin | 219/113 |
| 2,515,636 A * | 7/1950 | Dawson et al. | 219/113 |
| 2,894,113 A | 7/1959 | Wakeley et al. | |
| 3,325,622 A * | 6/1967 | Cordner | 219/95 |
| 3,360,632 A * | 12/1967 | Huffman | 219/113 |
| 3,487,188 A * | 12/1969 | Draving | 219/113 |
| 3,604,888 A * | 9/1971 | Friess et al. | 219/113 |
| 4,339,652 A * | 7/1982 | Bailey et al. | 219/113 |
| 4,746,783 A | 5/1988 | Shibuya et al. | |
| 4,785,159 A | 11/1988 | Hruska | |
| 4,965,860 A | 10/1990 | Jochi | |

FOREIGN PATENT DOCUMENTS

| | | |
|---|---|---|
| EP | 1 166 943 A2 | 1/2002 |
| GB | 1 508 485 | 9/1975 |
| GB | 2300079 A * | 10/1996 |
| JP | 3-35883 A * | 2/1991 |

* cited by examiner

*Primary Examiner*—Clifford C. Shaw
(74) *Attorney, Agent, or Firm*—Scully, Scott, Murphy & Presser

(57) ABSTRACT

A micro-welder, by which a superfine wire such as a lead wire can be welded on a desired position of a parent material with a minimum welding area, including: a power source having a capacitor-charging device for generating a predetermined voltage and a voltage controller for adjusting the level of voltage output from the capacitor-charging device; a charge-storing member connected in parallel to the power source for storing the voltage output from the capacitor-charging device; a switching member connected in parallel to the charge-storing means for conducting the voltage output from the capacitor-charging device; a switch driving member for turning-on the switching member; and a welding circuit connected in serial to the switching member.

3 Claims, 2 Drawing Sheets

MICRO-WELDER

BACKGROUND OF THE INVENTION

1. Field of the Invention

The present invention relates to a micro-welder, and particularly, to a micro-welder which allows a superfine wire such as a lead wire to be welded onto a desired portion of a parent material with a minimum welding area.

2. Description of the Background Art

Generally, there are two methods to unite two separate metal materials, that is, a soldering method and a welding method.

Soldering is a method for uniting the separate metals by putting together a metal to be united and different metal (having lower melting point) on a junction point and melting the different metal, while the welding is a method for uniting the separate metals by directly melting the junction portion of the metal.

Generally, the soldering method is usually used in a small scale such as when attaching a device and connecting a wire in electronic components, and the welding method is used in a large scale such as construction, power generation plant or aircraft.

Therefore, in case that the wire is attached onto a parent material such as a circuit board, the soldering method is mainly used.

However, the soldering method is not desirable in case that superfine wire in the order of AWG (American Wire Gauge) 10~40 should be attached onto the parent material.

That is, the soldering method is a method of attaching the separate metals by melting the different metal, and therefore, the area of the junction portion increases. In addition, it may cause wrong operation of the circuit which performs fine operations.

For such reasons, the method of attaching a superfine wire directly onto the parent material by melting the wire is preferred.

However, the conventional welding apparatus is not able to perform the fine welding such as melting the superfine wire and attaching the wire onto the parent material.

SUMMARY OF THE INVENTION

Therefore, an object of the present invention is to provide a micro-welder which allows a superfine wire to be welded onto a parent material with a minimum welding area using energy charged in a capacitor.

To achieve the object of the present invention, as embodied and broadly described herein, there is provided a micro-welder comprising: a power source means comprising a capacitor-charging device for generating a predetermined voltage and a voltage controller for adjusting the voltage level output from the capacitor-charging device; a charge-storing means connected in parallel to the power source means for charge-storing the voltage output from the capacitor-charging device; a switching means connected in parallel to the charge-storing means for conducting the voltage output from the capacitor-charging device; a switch driving means for turning-on the switching means; and a welding circuit means connected in serial to the switching means.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
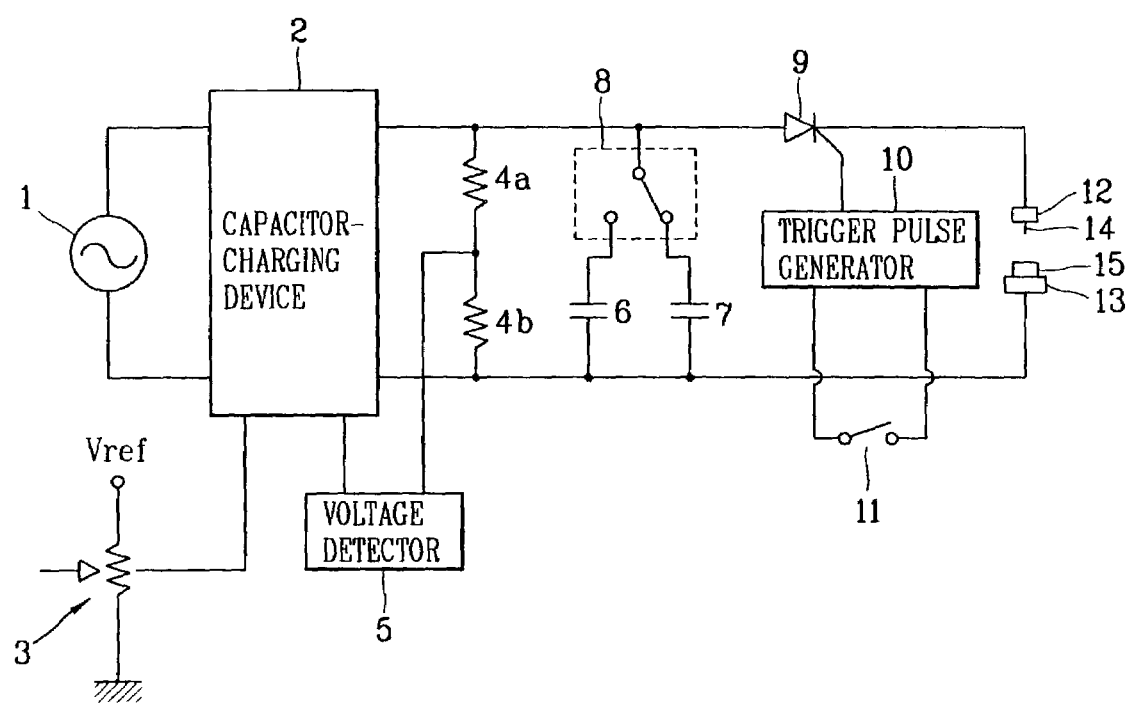
FIG. 1 is a block diagram showing a micro-welder according to the present invention.

FIG. 1 is a block diagram showing a micro-welder according to the present invention.

As shown therein, reference numeral 1 represents AC power supply, 2 is a device for charging a capacitor, 3 is a voltage controller, 4a and 4b are voltage detective resistors, 5 is voltage detector, 6 and 7 are capacitors, 8 is a selection switch, 9 is a thyrister switch, 10 is a trigger pulse generator, 11 is a foot switch, and 12 and 13 represent welding electrodes (compressing electrode and parent material electrode). On the other hand, reference numerals 14 and 15 represent a superfine wire and a parent material which are objects of welding respectively.

In the micro-welder as constructed above, when the AC power supply 1 is supplied to the capacitor-charging device 2, the capacitor-charging device 2 outputs the voltage determined by the voltage controller 3 to an output terminal.

The two voltage detective resistors 4a and 4b in serial are connected in parallel to the output terminal of the capacitor-charging device 2.

The voltage detector 5 is connected to a contact point between the two voltage detective resistors 4a and 4b, and checks whether or not the voltage output from the output terminal of the capacitor-charging device 2 is equal to the voltage determined by the voltage controller 3.

Herein, the voltage is measured on the contact point between the two voltage detective resistors 4a and 4b since a voltage-detecting range of the voltage detector 5 is limited.

The voltage output from the capacitor-charging device 2 is charged on the capacitors 6 or 7 which is selected by the selection switch 8.

FIG. 1 shows an embodiment in which two capacitors are used, however, it is not limited thereto. In addition, three or more capacitors may be connected to the capacitor-charging device 2 in parallel, and the various voltage levels can be charged into the respective capacitors.

When the foot switch 11 is pushed in the state that the voltage is charged on the capacitors 6 and 7 as described and the selection switch 8 is connected to a terminal of the capacitor 7 as shown in FIG. 1, a trigger pulse is generated from the trigger pulse generator 10.

The trigger pulse output from the trigger pulse generator 10 is applied to a gate of the thyrister switch 9 to turn-on the thyrister switch 9 momentarily.

When the thyrister switch 9 is turned-on, the voltage (energy) charged in the capacitor 7 is applied to the welding electrodes 12 and 13.

When the voltage is applied to the welding electrodes 12 and 13, contact resistance is generated between the superfine wire 14 such as fine copper wire attached on the compressing electrode 12 and the parent material 15 such as constantan attached on the parent material electrode 13. Accordingly, the heat (0.001~4.98 Joule) is generated between the electrodes by the contact resistance, and the superfine wire 14 is melted by the heat. The superfine wire 14 then is compressed onto the parent material 15 and welded on the junction point of the parent material 15.

Figure 2A:
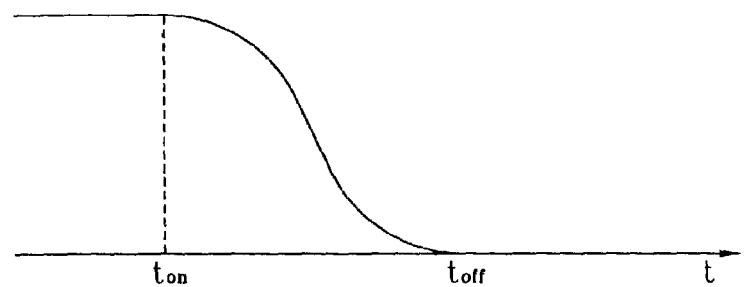
FIGS. 2A and 2B are graphs of voltage and current shown on welding electrode of the micro-welder according to the present invention.
Figure 2B:
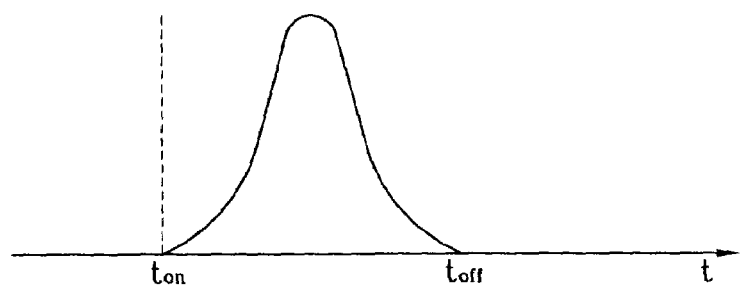

FIGS. 2A and 2B show voltage (a) and current (b) between the compressing electrode 12 and the parent electrode 13 when the thyrister switch 9 is turned-on.

As described above, when the thyrister switch 9 is turned-on at time $t_{on}$, the voltage on the capacitor 7 is created across the welding electrodes 12 and 13, and then the voltage is gradually lowered while the current increases all at once.

The heat is generated by the rapidly increased current, and the superfine wire 14 is melted by the generated heat.

And then when the thyrister switch 9 is turned-off at time $t_{off}$, the voltage and the current become '0'.

Figure 3:
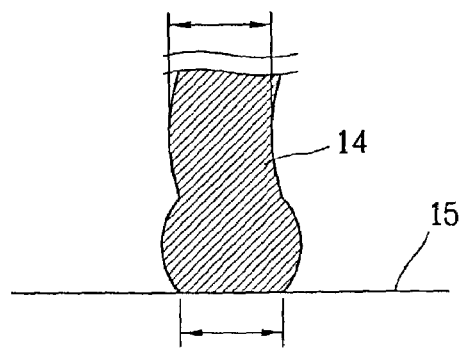
FIG. 3 is an exemplary view showing a superfine wire welded on a parent material using the micro-welder according to the present invention.

FIG. 3 shows an extended view of the superfine wire welded on the parent material using the micro-welder according to the present invention.

As shown therein, the superfine wire 14 is welded on the parent material without occupying large area.

Actually, a diameter of a copper wire used as the superfine wire in the welding experiment using the micro-welder according to the present invention is 0.02 mm, and a diameter of the copper wire welded on the parent material is about 0.035 mm.

As described above, according to the micro-welder of the present invention, after the various voltages depending on the property of the superfine wire and the parent material are charged into a popularity of capacitors, the heat generated by momentary discharging of the capacitors melts the superfine wire. Therefore, the superfine wire can be welded on the desired position of the parent material with the minimum welding area.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A welding current circuit for micro-welding wires, comprising:

a power source means having a capacitor-charging device for generating a specified voltage and a voltage controller for adjusting the level of voltage output from the capacitor-charging device;

a charge-storing means connected in parallel to the power source means;

a switching means connected between the charge-storing means and welding electrodes and in series with the welding electrodes; and a switch driving means which outputs a trigger pulse to the switching means, wherein the switch driving means controls the welding current circuit to generate an adequate current and voltage for effectuating the micro-welding based on the trigger pulse; and wherein the charge-storing means comprises a plurality of condensers possessing varying capacitances for storing a variety of voltages, and a selection switch for selecting one of the plurality of condensers.

2. The welding current circuit of claim 1, wherein the switching means is a thyristor switch.

3. The welding current circuit of claim 1, wherein the welding current circuit generates heat within a range of about 0.001 to 4.98 Joules during micro-welding.

* * * * *